(12) United States Patent
Finberg et al.

(10) Patent No.: US 9,197,081 B2
(45) Date of Patent: Nov. 24, 2015

(54) HIGH-EFFICIENCY BATTERY EQUALIZATION FOR CHARGING AND DISCHARGING

(75) Inventors: Steve Finberg, Cambridge, MA (US); Michael Kishinevsky, North Andover, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 908 days.

(21) Appl. No.: 12/870,078

(22) Filed: Aug. 27, 2010

(65) Prior Publication Data

US 2011/0057617 A1   Mar. 10, 2011

Related U.S. Application Data

(60) Provisional application No. 61/237,993, filed on Aug. 28, 2009.

(51) Int. Cl.
*H02J 7/00* (2006.01)

(52) U.S. Cl.
CPC .......... *H02J 7/0016* (2013.01); *Y02T 10/7055* (2013.01)

(58) Field of Classification Search
CPC ..................................................... H02J 7/0016
USPC ............................................... 320/118–122
See application file for complete search history.

(56) References Cited

U.S. PATENT DOCUMENTS

| | | | |
|---|---|---|---|
| 3,496,442 A | 2/1970 | Carlisle | |
| 3,796,940 A | 3/1974 | Mauch et al. | |
| 4,061,955 A | 12/1977 | Thomas et al. | |
| 5,160,851 A | 11/1992 | McAndrews | |
| 5,283,512 A | 2/1994 | Stadnick et al. | |
| 5,656,915 A | 8/1997 | Eaves | |
| 6,034,506 A * | 3/2000 | Hall | 320/117 |
| 6,084,382 A | 7/2000 | Hite | |
| 6,121,752 A * | 9/2000 | Kitahara et al. | 320/122 |
| 6,420,852 B1 | 7/2002 | Sato | |
| 7,705,491 B2 | 4/2010 | King et al. | |
| 8,330,419 B2 * | 12/2012 | Kim et al. | 320/121 |
| 2006/0097700 A1 | 5/2006 | Studyvin et al. | |

FOREIGN PATENT DOCUMENTS

| | | |
|---|---|---|
| EP | 2075894 | 7/2009 |
| GB | 912666 A | 12/1962 |
| WO | WO-03/021739 | 3/2003 |
| WO | WO-2008/055505 | 5/2008 |

OTHER PUBLICATIONS

International Search Report for PCT Application No. PCT/2010/046949, mailed Feb. 18, 2011, 4 pages.
Written Opinion for PCT Application No. PCT/2010/046949, mailed Feb. 18, 2011, 7 pages.

(Continued)

*Primary Examiner* — Richard V Muralidar
(74) *Attorney, Agent, or Firm* — Goodwin Procter LLP (57) ABSTRACT

A non-contiguous group of cells in a battery of cells is selected for charging or discharging the battery.

10 Claims, 8 Drawing Sheets

(56) References Cited

OTHER PUBLICATIONS

Davis "Protecting Lithium-Ion Batteries for Electric Vehicle Applications," [online]. Power Electronics Technology, Penton Media, Inc., Apr. 1, 2010 [retrieved Jul. 1, 2010]. Retrieved from the Internet: <http://www.powerelectronics.com/portable_power_management/batteries/protecting-lithium-ion-batteries-201004/index.html>, 11 pages.

Rodriguez et al. "Operation of a Medium-Voltage Drive Under Faulty Conditions" IEEE Transactions on Industrial Electronics, vol. 52, No. 4, Aug. 2005, pp. 1080-1085.

* cited by examiner

HIGH-EFFICIENCY BATTERY EQUALIZATION FOR CHARGING AND DISCHARGING

CROSS-REFERENCE TO RELATED APPLICATION

This application claims priority to and the benefit of, and incorporates herein by reference in its entirety, U.S. Provisional Patent Application No. 61/237,993, which was filed on Aug. 28, 2009.

STATEMENT REGARDING FEDERALLY SPONSORED RESEARCH OR DEVELOPMENT

This invention was made with government support under Contract Number HR0011-08-C-0060 awarded by the Defense Advanced Research Projects Agency ("DARPA"). The U.S. Government has certain rights in the invention.

TECHNICAL FIELD

Embodiments of the invention generally relate to rechargeable batteries and, in particular, to efficiently charging and discharging cells in a battery.

BACKGROUND

Many different applications, from consumer electronic devices to vehicles and power grids, use rechargeable batteries as energy sources. Typically, these applications require their batteries to be as safe and as efficient as possible. Overcharging a battery, for example, may compromise its reliability and reduce its useful lifetime. More alarmingly, overdischarging a battery can cause it to catch fire or even explode. Thus, any application that charges and/or discharges a battery typically includes circuitry to prevent overcharging and/or over-discharging.

Protecting a battery against these undesirable conditions, however, may be a complicated task. Many batteries, especially high-voltage or high-power batteries, are composed of a plurality of discrete cells, each of which is separately monitored. As more cells are included in the battery (e.g., to increase its voltage or power output), the chance of one cell performing at a level different from the other cells in the battery increases. For example, manufacturing defects or variations may cause each cell in a battery to have a different voltage output, charge capacity, maximum charging voltage, and/or minimum discharging voltage. Even perfectly matched cells may, over time, become mismatched with usage and age. The worst-performing cell may act as a "weak link" in the battery; an overcharge-protection circuit, for example, may halt charging of the battery when the worst-performing cell reaches its limit, despite the additional capacities of other cells in the battery.

Circuitry may be added to the battery to charge and/or discharge the cells to their individual capacities. This circuitry, however, may reduce a battery's efficiency and/or significantly increase its cost or complexity. A charge-shunting circuit, for example, dumps excess charge into resistors to protect battery cells. This charge dumping, however, generally wastes energy and produces heat. A switched-capacitor or flying-capacitor circuit is typically more efficient, but requires the use of a complicated, costly, and large capacitor and transformer network. Still other circuits allow a subset of electrically adjacent cells in a battery to be charged and/or discharged, but require a complicated, expensive switching network and, because only adjacent cells may be chosen, perform sub-optimally when, for example, cells in the middle of the battery fail or degrade.

A need therefore exists for a robust, efficient, and flexible battery-charging and -discharging system to optimize the charging and discharging of individual cells in a battery—for example, capable of fully charging and discharging any cell in a battery, regardless of variations therein, while protecting the cells from overcharging and over-discharging.

SUMMARY

Embodiments of the present invention feature a system that selects a subset of cells in a battery for charging and/or discharging in a manner that ensures optimal utilization of all cells, while accounting for cell-by-cell variation. The selected cells may be contiguous (i.e., electrically adjacent to each other) or non-contiguous (i.e., separated electrically by at least one other cell). By selecting the least-charged cells (when charging the battery) or the most-charged cells (when discharging the battery), each cell is charged or discharged according to its individual capacity, and over time, the cells in the battery are optimally utilized and not overcharged or over-discharged. The cells may be monitored during use (e.g., during charging or discharging) and the subset of cells may be changed to reflect the changing state of the cells. By such time-cycling of the charge and discharge loads across the cells, no lossy and/or expensive charge-distribution circuitry is required. Under-performing or failed cells may be bypassed, preserving the usefulness of the battery while allowing the battery capacity to degrade gracefully.

In general, in some aspects, embodiments of the invention feature methods for charging (or discharging) a battery of cells. The methods include determining a voltage of each of a plurality of cells in the battery and selecting a subset of the plurality of cells based at least in part on the determined voltages. A series connection of non-contiguous cells may then be created. The series connection of cells includes the subset of cells. The series connection of cells may then be charged with a charging voltage (or discharged into a load).

In various embodiments, selecting the subset of cells includes determining at least one of a resting voltage, impedance, or state of charge of the cells. The series connection of cells may include at least two adjacent cells. An operating voltage of the series connection of cells may be approximately equal to the charging voltage (or to a desired voltage across the load), and the charging voltage may be modulated with a switching circuit. The voltage of each of the plurality of cells may be determined again after a delay and, based on the new voltage determinations, a new subset of the plurality of cells may be selected. The voltage of each cell in the series connection of cells may be monitored during charging (or during discharging). Cells in the series connection of cells may be mismatched and a parameter (e.g., resting cell voltage, cell impedance, and percentage of charge) of each cell may deviate, during charging (or discharging), by less than 1% across the cells. In addition, a faulty cell in the battery may be identified and bypassed.

In general, in another aspect, a system for managing charge on cells in a battery includes a voltage-sensing circuit and a processor. The voltage-sensing circuit senses a voltage across each of a plurality of cells. The processor selects a subset of the plurality of cells based at least in part on the sensed voltage. The processor further causes a subset of the plurality of cells to be electrically coupled in a non-contiguous series connection. The system also includes an output port across the series connection of cells.

In various embodiments, selecting the subset of the plurality of cells is further based on a resting voltage, impedance, or state of charge of each of the plurality of cells. The voltage-sensing circuit may include a voltage sensor local to each cell. Each of the plurality of cells may further include circuitry for disabling the cell if the sensed voltage deviates from a threshold, and/or a bypass switch. The processor may further include circuitry for selecting, after a delay, a new subset of the plurality of cells. A pulse-width modulator may adjust a voltage across the output port, which may be applied to a voltage source for charging the series connection of cells or to a load for discharging the series connection of cells.

In general, in yet another aspect, a system for managing charge on cells in a battery includes a plurality of cells, each in parallel with a bypass switch and in series with a cutoff switch. A voltage-sensing circuit senses a voltage across each of the plurality of cells. A processor selects a subset of the plurality of cells based at least in part on the sensed voltages, and configures, using the bypass and cutoff switches, a series connection of cells comprising the subset of the plurality of cells.

BRIEF DESCRIPTION OF THE DRAWINGS

The foregoing and other objects, aspects, features, and advantages of the invention will become more apparent and may be better understood by referring to the following description, taken in conjunction with the accompanying drawings, in which.

DETAILED DESCRIPTION

Described herein are various embodiments of systems and methods for optimally charging and/or discharging a subset of cells in a battery. Note that, as used herein, the term "cell" generally refers to a single electrochemical storage device, while the term "battery" generally refers to an array of two or more such cells. The term "safe cell" generally refers to a single cell and its associated circuitry, in accordance with embodiments of the invention, for monitoring and/or controlling the cell. A "string of safe cells" (or, simply, a "string" or a "string of cells") generally refers to a plurality of safe cells connected in series.

Figure 1:
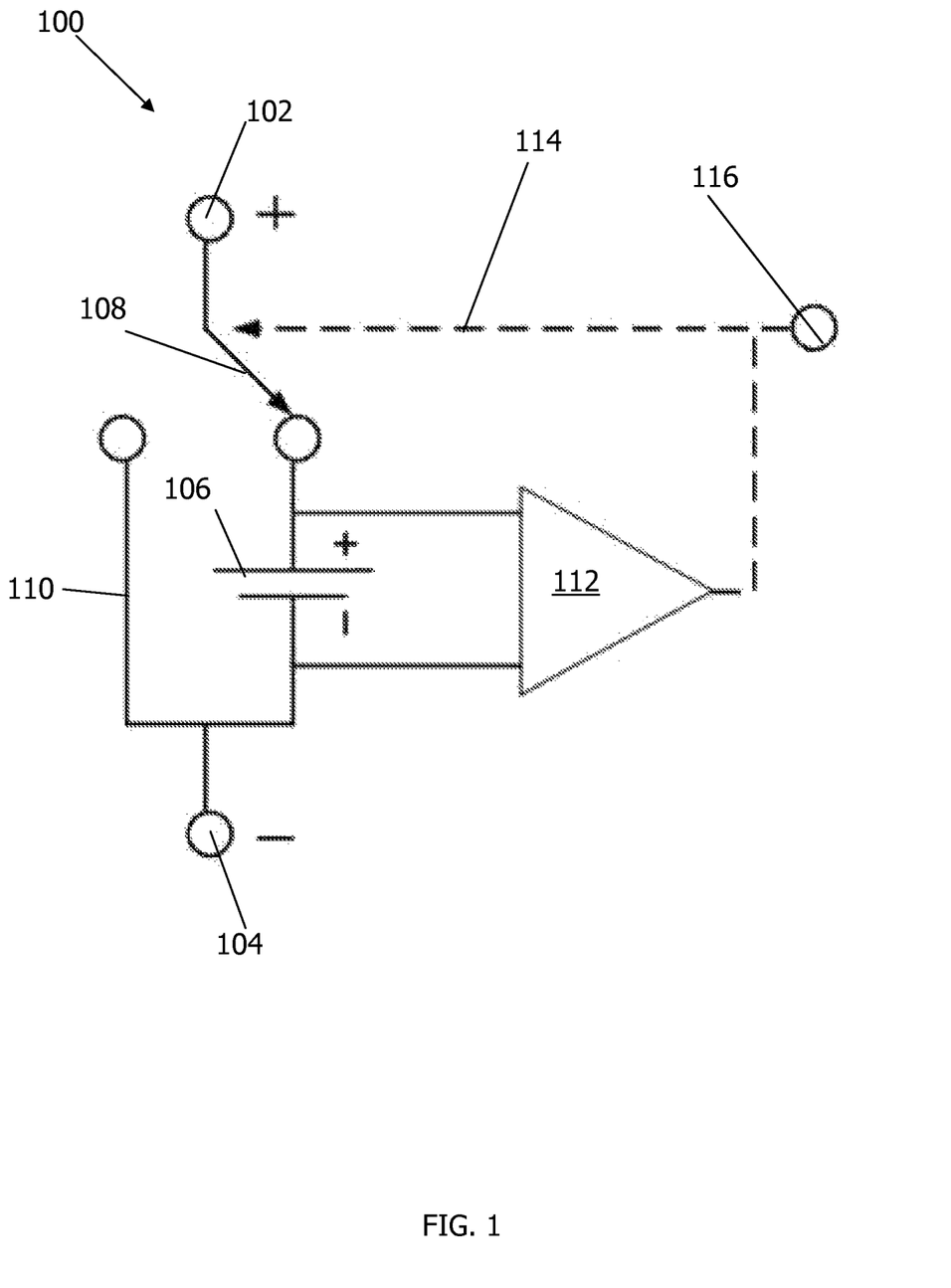
FIG. 1 is a schematic illustration of a safe cell in accordance with one embodiment of the invention.

FIG. 1 is an illustrative embodiment of a safe cell 100 that includes a positive terminal 102 and a negative terminal 104. A cell 106 is connected to a bypass switch 108 that selects between a first mode of operation, in which the cell 106 is connected in series between the positive 102 and negative 104 terminals, and a second mode of operation, in which a bypass route 110 connects the positive terminal 102 directly to the negative terminal 104. The cell 106 may be charged or discharged in the first mode, while the cell 106 is disconnected and idle in the second mode. The bypass switch 108 may be implemented as any type of switch known in the art, such as a solid-state transistor-based switch or a relay.

The safe cell 100 may further include a monitoring device 112 that measures the voltage across the cell 106. If the measured voltage deviates from an acceptable range of values (e.g., lower than 2.4 volts or greater than 4.1 volts for a lithium-polymer ("LiP") cell), the monitoring device 112 may send a signal 114 to the switch 108 to bypass the cell 106. In one embodiment, the monitoring device 112 is a voltage comparator. An external connection 116 may receive the output of the monitoring device 112 and/or provide a control signal for the switch 108.

Figure 2:
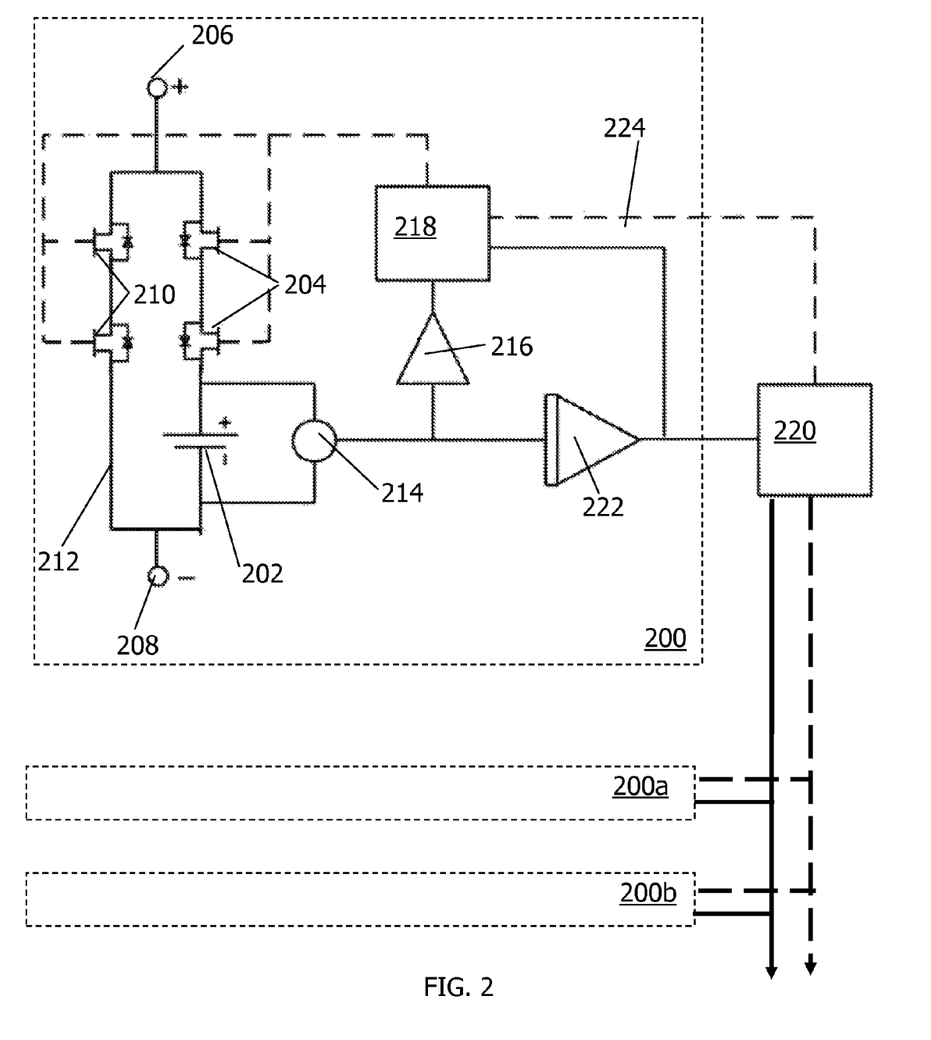
FIG. 2 depicts an exemplary implementation of the safe cell illustrated in FIG. 1 in accordance with one embodiment of the invention.

FIG. 2 depicts an exemplary implementation 200 of the safe cell 100 illustrated in FIG. 1. As illustrated in FIG. 2, a cell 202 is connected in series with field-effect transistor ("FET") cut-off switches 204 that allow the cell 202 to be connected in series with positive 206 and negative 208 terminals. A set of bypass FET switches 210 allow for a direct connection 212 between the positive 206 and negative 208 terminals that does not include the cell 202. The cut-off and bypass FET switches 204, 210 may be any type of semiconductor-based or mechanical switch. Two or more FET switches 204, 210 may be connected in series in each path, as shown in FIG. 2, to improve reliability of the switches, or in parallel in each path to provide redundancy. In one embodiment, only one FET switch is used in the bypass connection 212 and only one FET switch is used in series with the cell 202. The FET switches 204, 210 may feature a very low series resistance at nominal current levels, but may be designed to limit current levels through the cell 202 at levels much greater than nominal (e.g., five to ten times greater than nominal). This current limiting may protect the cell 202 against, for example, an accidental short across the terminals 206, 208.

A voltage sensor 214 monitors the voltage across the cell 202 and outputs a signal based on the monitored voltage to a comparator 216 that compares the monitored voltage to a reference value or values. A cell logic unit 218 observes the output of the comparator 216 and, if the voltage of the cell 202 falls outside a safe range, as determined by the reference value(s), opens the series FET switches 204 and closes the bypass FET switches 210, thereby protecting the cell 202 against a further deviation from the safe range.

A processor 220 may control the safe cell 200 and one or more additional safe cells 200a-b, as explained further below. The processor 220 may receive the output of the voltage sensor 214. In one embodiment, the output of the voltage sensor 214 is converted to a digital signal by an analog-to-digital converter ("ADC") 222 before being passed to the processor 220. As described further below, the processor 220 may provide a control signal 224 to the cell logic unit 218 that may instruct the cell logic unit 218 to open or close any of the FET switches 204, 210.

The processor 220 and the cell logic unit 218 may each be any digital, analog, or mixed-signal processing engine, including but not limited to microprocessors, microcontrollers, FPGAs, ASICs, and/or firmware. Some or all of the functionality of the processor 220 and/or the cell logic unit 218 may be implemented in software. The processor 220 and/or the cell logic unit 218 may be redundant or fault-tolerant units, so that a hardware failure therein does not compromise the operation and safety of the safe cell 200.

Figure 3:
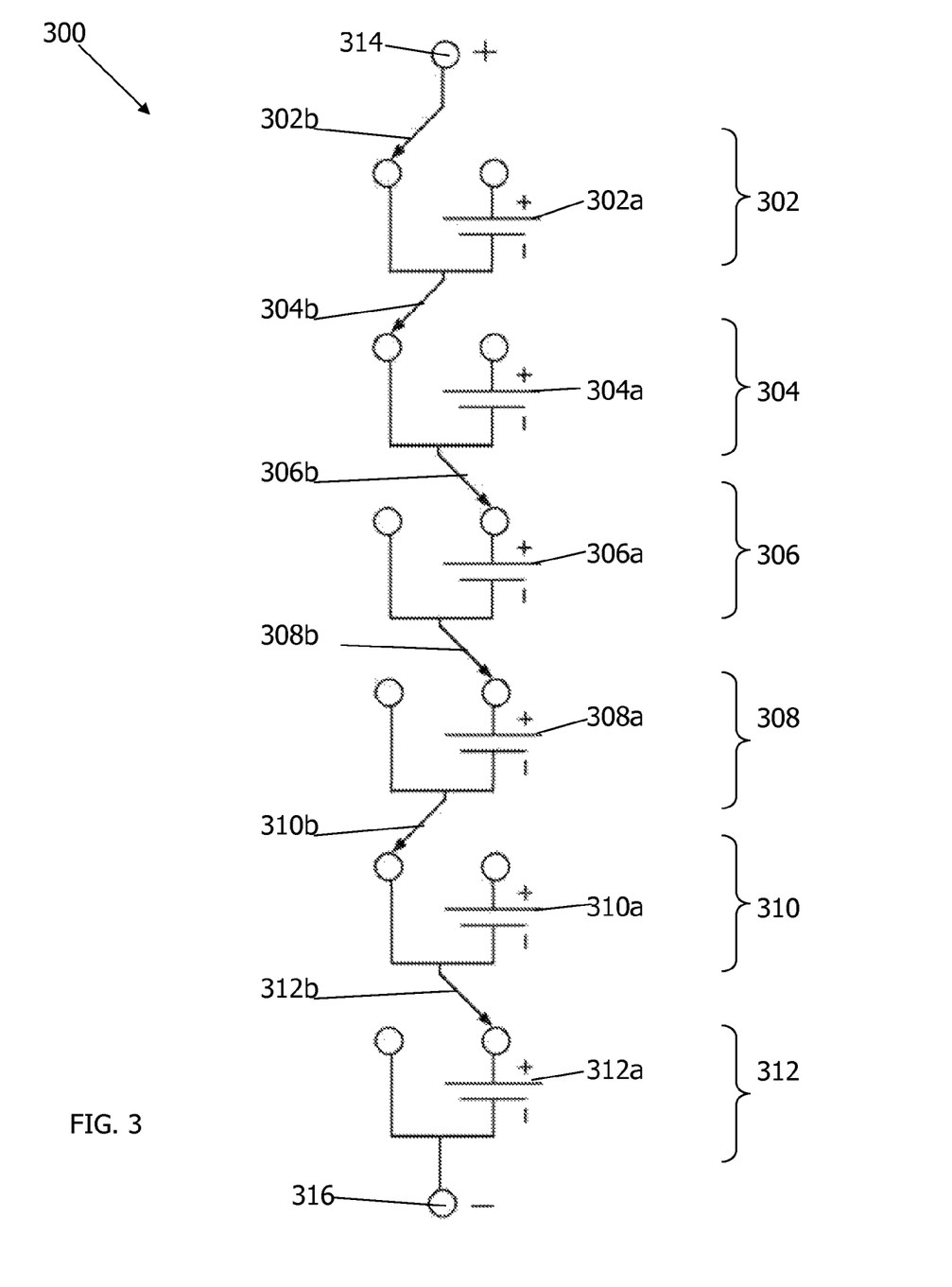
FIG. 3 depicts a string of safe cells in accordance with an embodiment of the invention.

FIG. 3 is an illustration of a string 300 of safe cells 302-312 that includes cells 302a-312a and switches 302b-312b in accordance with embodiments of the invention. A subset of the cells 302-312 may be chosen (e.g., electrically coupled together) at any one time to provide a desired output voltage across the output terminals 314, 316. For example, each cell 302-312 may be a two-volt cell, and the string 300 may be required by an application to output six volts across its terminals 314, 316. The string 300 may thus be configured to select three of the six cells 302-312, because three two-volt cells, combined in series, provide six volts. In the embodiment depicted in FIG. 3, three cells 306a, 308a, 312a (i.e., a non-contiguous group of cells) are connected in series with the terminals 314, 316. The selected cells 306a, 308a, 312a are non-contiguous at least because a cell 310a is located electrically within the selected cells 306a, 308a, 312a but is not selected for inclusion therein. Note that the non-contiguous selected cells 306a, 308a, 312a include two adjacent cells 306a, 308a. Three other cells 302a, 304a, 310a are bypassed using bypass switches 302b, 304b, 310b, respectively. As explained further below, the series-connected cells 306a, 308a, 312a may be chosen during battery charging because they have the lowest charge of the six cells 302a-312b. Alternatively, during battery discharging, the series-connected cells 306a, 308a, 312a may be chosen because they have the highest charge of the six cells 302a-312a.

In general, the string 300 includes at least one more cell than a minimum number of cells required to create a desired output voltage. Including additional cells in the string 300 may improve the lifetime, fault-tolerance, and total available charge of the string 300. High-power batteries, for example, may include hundreds of cells of which only half are selected at any one time. The current invention, however, is not limited to batteries having any particular number of cells. The cells 302-312 may be non-rechargeable or "primary" cells or rechargeable or "secondary" cells. Secondary cells may be charged and/or discharged in accordance with embodiments of the current invention; primary cells may be discharged in accordance with embodiments of the current invention.

In one embodiment, a failing cell 302-312 in the string of cells 300 is permanently disabled (by, e.g., putting the cell in permanent bypass mode). Because non-contiguous cells may be combined to form a string of cells (of any size) around the failing cell, a single failing cell does not affect the functionality of the string 300. As more cells fail, however, the string of cells 300 may provide less total capacity due to the missing cells. The energy capacity of the string of cells may thus degrade gracefully, allowing continued use while providing warning to an application using the string of cells that a complete failure of the string of cells may be drawing near.

Figure 4:
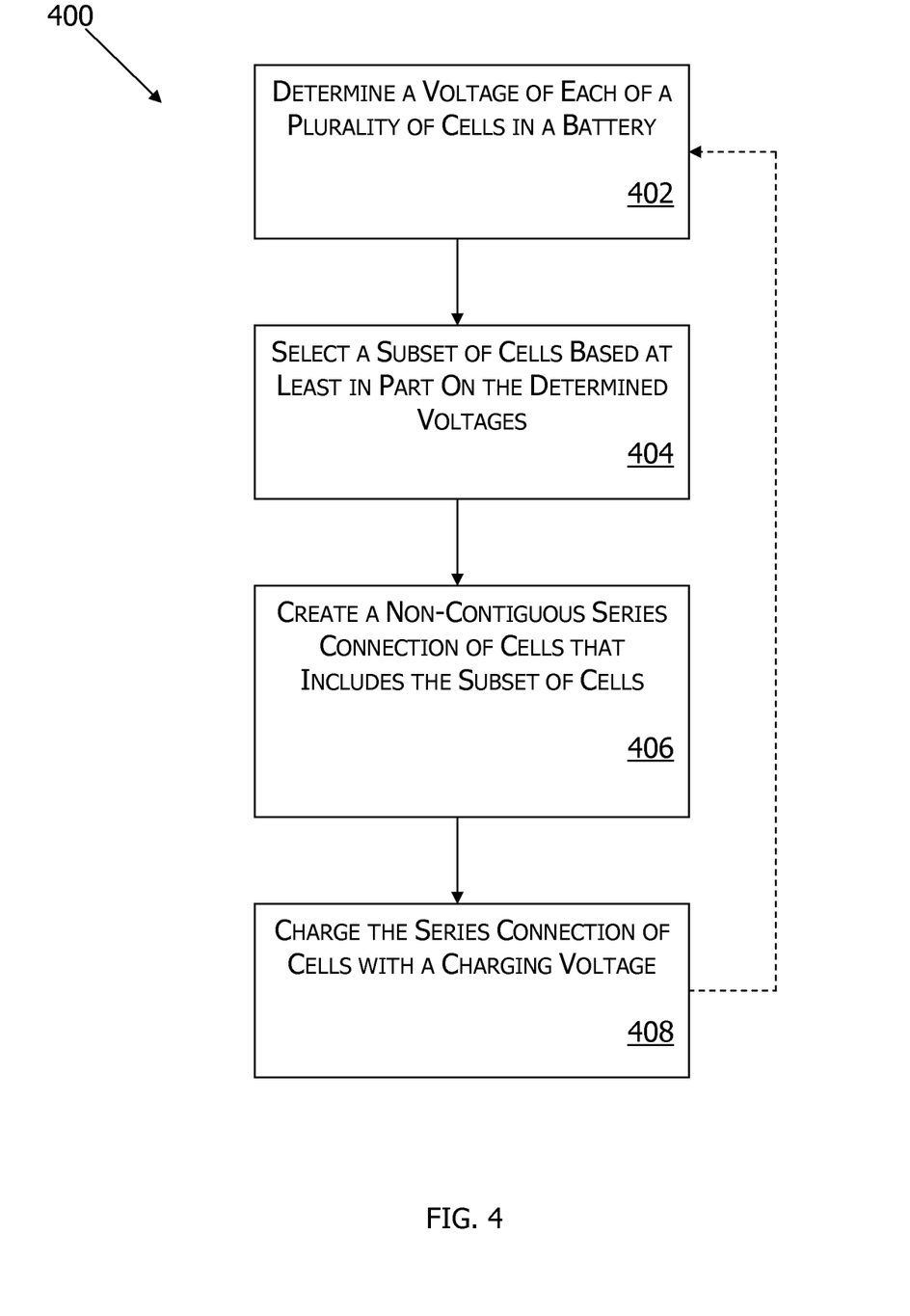
FIG. 4 depicts a flowchart for charging a string of safe cells in accordance with an embodiment of the invention.

FIG. 4 is a flowchart 400 of an exemplary method for charging a battery of cells. In brief overview, voltages of each of a plurality of cells in the battery are determined (Step 402) and a subset of cells is selected based at least in part on the determined voltage (Step 404). The subset of cells is then used to create a non-contiguous series connection of cells (Step 406). The series connection of cells is then charged (Step 408).

Referring to the first Step 402 in greater detail, a voltage $V_{cell}$ of each cell in the battery may be determined using, for example, the voltage sensor 214 described above with reference to FIG. 2. The cell voltage $V_{cell}$ may be measured when the cell is switched into the string 300 or "on" ($V_{cell\_on}$) and when the cell is switched out of the string 300 and idle ($V_{cell\_off}$). In one embodiment, the cell is allowed to settle after switching for several (e.g., 5-20) seconds in its current state before a measurement is taken, thereby ensuring that the electrochemical properties of the cell have stabilized and improving the quality of the measurement. The current running in the string of cells 300, $I_{string}$, is also measured. The impedance of a given cell, $Z_{cell}$, may then be computed according to the equation:

$$Z_{cell} = \frac{V_{cell\_on} - V_{cell\_off}}{I_{string}} \quad (1)$$

$V_{cell\_on}$ and $V_{cell\_off}$ may be re-measured each time each time a cell is connected or disconnected from the string 300, and $Z_{cell}$ may be re-computed accordingly.

Once $Z_{cell}$ has been computed, a current state of a cell may be predicted using $Z_{cell}$, even if the cell has been charged or discharged since the last measurement of $V_{cell}$. More specifically, the resting voltage of a connected cell, $V_{rest}$, may be estimated by computing:

$$V_{rest} = V_{cell\_on} - (Z_{cell} \times I_{string}) \quad (2)$$

where $V_{cell\_on}$ in equation (2) is the measured voltage of the cell while the cell is switched into the string 300. In other words, because the cell's impedance $Z_{cell}$ is known, the cell's resting voltage $V_{rest}$ may be estimated even when current is running through the cell. If the cell is disconnected, $V_{rest}$ is simply the measured cell voltage $V_{cell\_off}$. The resting voltage $V_{rest}$ is equivalent to the Thevenin voltage of the cell.

Similarly, the operating voltage of a disconnected cell, $V_{operating}$, may be estimated by computing:

$$V_{operating} = V_{cell\_off} + (Z_{cell} \times I_{string}) \quad (3)$$

where $V_{cell\_off}$ in equation (3) is the measured voltage of the cell when the cell is switched out of the string 300. If the cell is connected, $V_{operating}$ is simply the measured cell voltage $V_{cell\_on}$.

Once the cell voltages have been measured or estimated, a subset of cells is selected based at least in part on the cell voltages (Step 404). In one embodiment, one or more cells having the lowest measured or computed resting voltage $V_{rest}$ is selected. In other embodiments, one or more cells having the highest computed impedance $Z_{cell}$ or the lowest state of charge is selected. In general, any method for determining the cell(s) in greatest need of charging may be used to select the subset of cells. For example, referring to the string 300 of cells 302-312 described above with reference to FIG. 3, the cells 306a, 308a, 310a may be determined to be the cells with the lowest voltages $V_{rest}$ and/or greatest impedances $Z_{cell}$.

Optionally, after a cell is identified, that cell may be individually charged. In a typical charging system, however, the available charging voltage is greater than a maximum safe voltage for an individual cell. For example, a six-member string of two-volt cells may be used to provide a six-volt power supply by selecting three of the six cells. Typically, a single two-volt cell may not be safely charged with a six-volt supply, because doing so may harm the cell. In addition, individually charging each cell in the string may take an unacceptably large amount of time and would be very inefficient.

Accordingly, once the subset of cells is identified in Step 404, a series connection of cells is created in Step 406. The series connection of cells may include any cells that require charging. Referring again to FIG. 3, for example, cells 306a and 312a are chosen to create a series connection of cells 306a, 308a, 312a. The switches 306b, 308b, 312b corresponding to the chosen cells 306a, 308a, 312a are activated (by, for example, the processor 220) to connect those cell in series with the terminals 314, 316. The switches 302b, 304b, 310b corresponding to the non-chosen cells 302a, 304a, 310a are activated to bypass those cells. The created series connection of cells 306a, 308a, 312a is non-contiguous because it "skips" a cell 310a within the battery of cells.

In one embodiment, each of the cells is ranked according to a charging criteria (e.g., $V_{rest}$, $Z_{cell}$, and/or state of charge), and the cells are added to the series connection of cells based on their rank. For example, a desired battery terminal voltage $V_{set}$ may be chosen (or may be specified by an application for use with the battery), and the cells having the lowest resting voltages $V_{rest}$ are added to the series connection of cells until the sum of their operating voltages $V_{operating}$ is approximately equal to $V_{set}$ (e.g., within a percentage equal to the inverse of the number of cells—within 10% of $V_{set}$ for a 10-cell battery or within 1% of $V_{set}$ for a 100-cell battery). As an example, cells may be safely charged by a range of different voltages, and $V_{set}$ may lie within that range.

In step 408, the series connection of cells is charged. The voltages across the cells may be monitored during charging, and the cells in the series connection may be removed from or added to the series connection as necessary. For example, referring again to FIG. 3, a switch 302b may be toggled to include a corresponding cell 302a in the series connection of cells, and another switch 312b may be toggled to remove its corresponding cell 312a from the series connection of cells. In one embodiment, the cell voltages $V_{cell\_on}$, $V_{cell\_off}$ are re-measured (i.e., the method returns to Step 402) after an interval of time (e.g., 1 second to two minutes) has passed. The interval of time may be determined by the total estimated charge time of the battery (e.g., between approximately 0.1 and 5% of the total charge time). An application may require more precise charge equalization across the cells and thus choose a shorter interval of time between measurements (incurring an associated penalty in increased energy usage per measurement). Alternatively, the application may reduce its power overhead by choosing a greater interval of time between measurements (at the cost of possibly less-precise charge equalization across the cells). The interval of time may be derived from a cell's charging rate and a desired equalization goal (e.g., less than 1% difference in a state of charge in a cell in the series connection of cells and another cell in the battery). Note that mismatched cells may contain a different absolute amount of charge but may be matched to other cells in the string of cells based on a percentage of charge, wherein the percentage is equal to charge in the cell divided by the capacity of the cell. In one embodiment, the combination and number of cells in the series connection of cells is varied automatically at these intervals, if needed. In another embodiment, the combination and number of cells in the series connection of cells is varied automatically to compensate for differences in a provided charging voltage. For example, if a charging voltage falls, the number of cells in the series connection of cells may be reduced from twelve to ten.

Once a cell reaches its maximum charge $V_{max}$, it is removed from the series connection of cells that is being charged. Each cell may be tested for reaching its maximum charge $V_{max}$ at each time interval. In one embodiment, the cells are tested for reaching their maximum voltage $V_{max}$ asynchronously by, for example, local cell logic 218. As more cells reach their maximum voltage $V_{max}$, the number of cells in the series connection of cells may decrease. Because the lowest-charged cells are continually identified and charged, all cells will be close to or at full charge when too few non-fully-charged cells are available to reach $V_{set}$.

Figure 7:
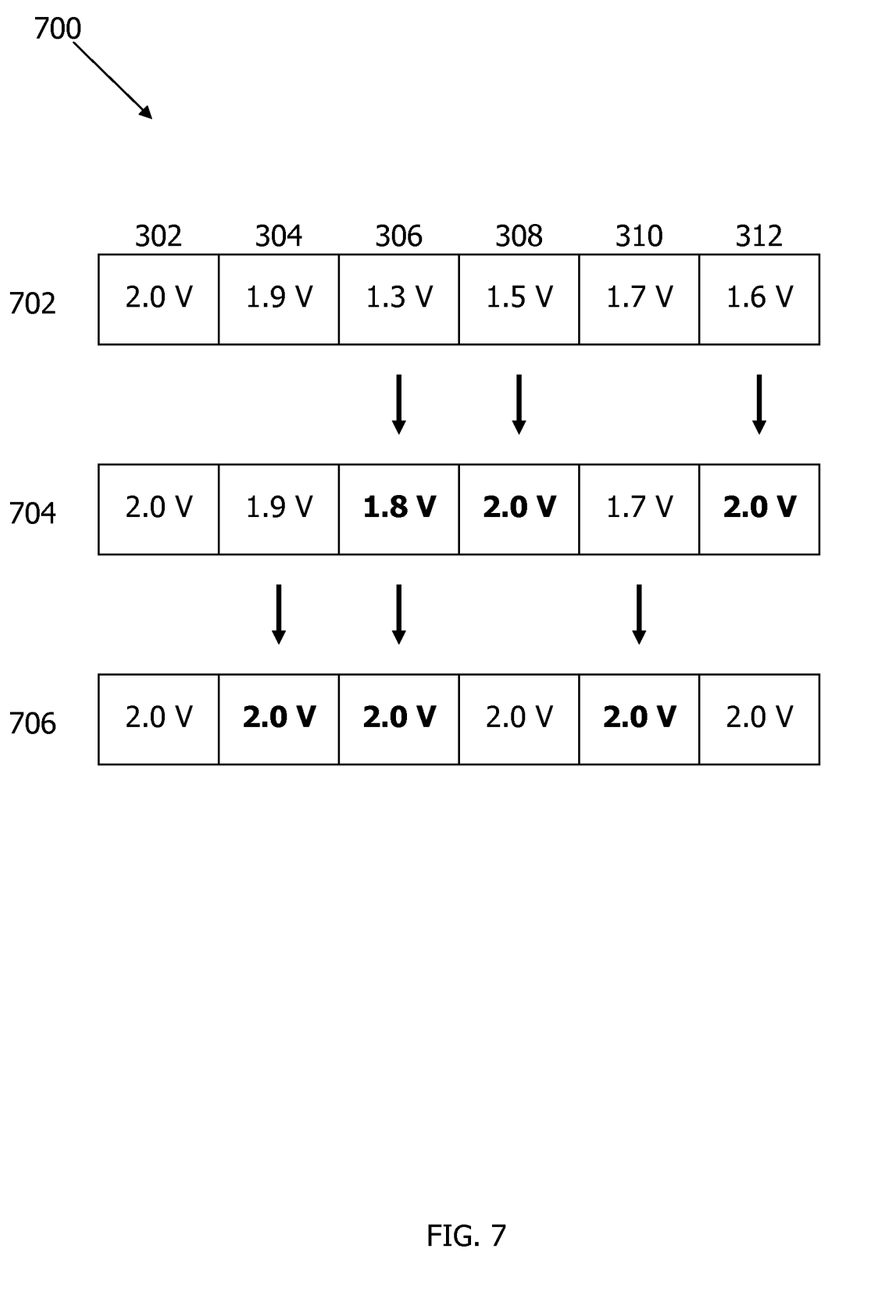
FIG. 7 depicts an exemplary charging sequence for a string of safe cells in accordance with an embodiment of the invention.

FIG. 7 illustrates an exemplary process 700 for charging cells in a battery in accordance with embodiments of the invention. Referring also to FIG. 3, in a first step 702, a battery of cells 302-312 is presented for charging; for this example, the operating voltage $V_{operating}$ of each cell 302-312 is assumed to be 2.0 V and the charging voltage $V_{set}$ is assumed to be 6.0 V. A cell 306 is determined to have the lowest resting voltage ($V_{rest}$=1.3 V). Additional cells 308, 312 having the next-lowest resting voltages ($V_{rest}$=1.5 V, 1.6 V) are selected so that the sum of the operating voltages $V_{operating}$ of the series connection of cells 306, 308, 312 equals the charging voltage ($V_{set}$=6.0 V). The cells 306, 308, 312 are then charged and, after a delay, the voltages of the cells are determined again in a second step 704. At this step, the voltage of the least-charged cell 306 has increased to 1.8 V, and the voltages of the other cells in the series connection of cells has increased to a maximum voltage $V_{max}$ of 2.0 V. Accordingly, a new series connection of cells is created to include new cells 304, 306, 310, with cell 310 now having the lowest resting voltage ($V_{rest}$=1.7 V). The new string of cells 304, 306, 310 is then charged, and, in a third step 706, it is determined that all cells 302-312 have reached their maximum voltage ($V_{max}$=2.0 V). Charging then ceases.

Figure 5:
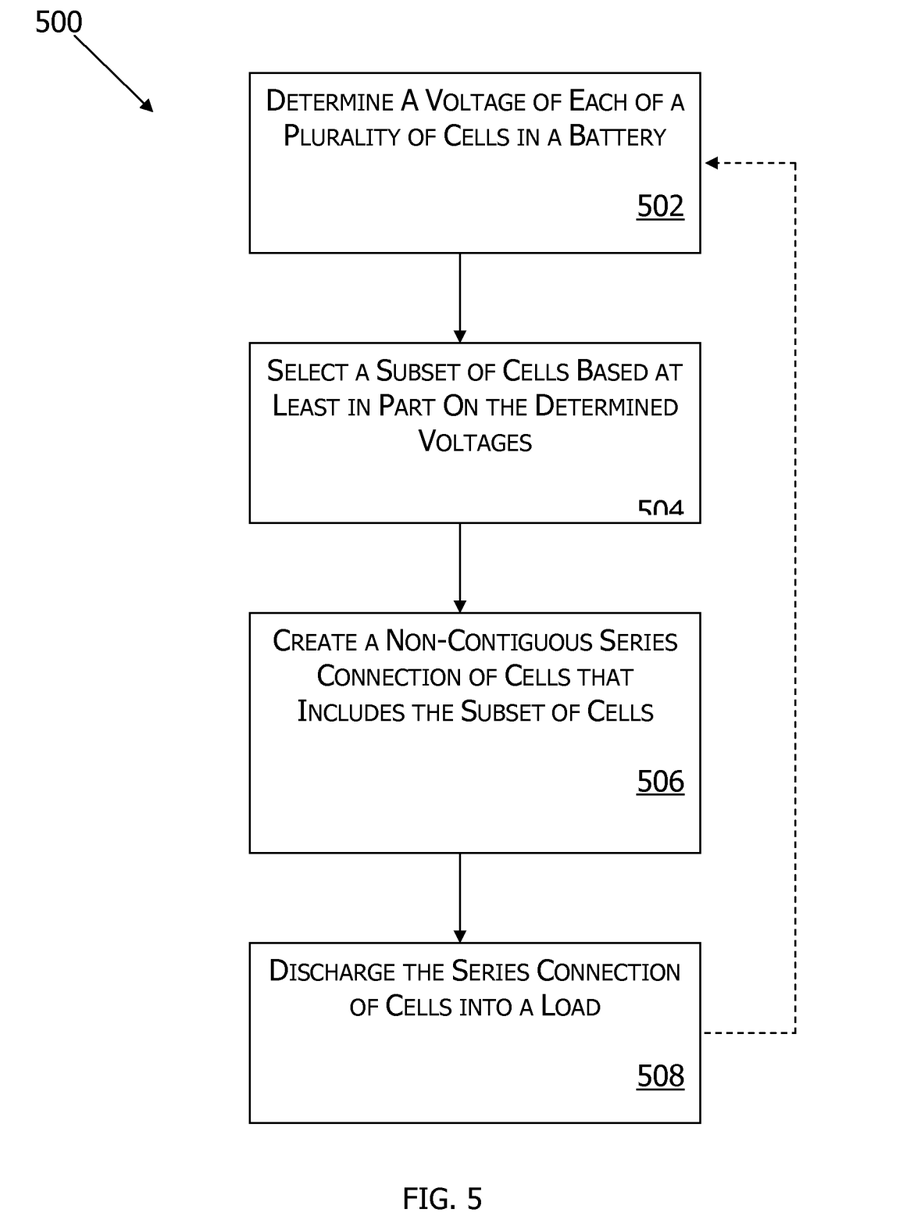
FIG. 5 depicts a flowchart for discharging a string of safe cells in accordance with an embodiment of the invention.

FIG. 5 is a flowchart 500 of an exemplary method for discharging a battery of cells. The method of discharging uses many of the same steps, measurements, and calculations described above with reference to FIG. 4. In a first step 502, individual cell voltages $V_{cell}$ are determined, as is the resting voltage $V_{rest}$ and operating voltage $V_{operating}$ of each cell. In a second step 504, a subset of cells is selected based at least in part on the determined voltages. For example, cells having the highest resting voltages $V_{rest}$ (or lowest impedance $Z_{cell}$ or highest state of charge) are selected, and, in a third step 506, the subset of cells is added to a series connection of cells until the sum of the operating voltages $V_{operating}$ of the selected cells is approximately equal to a desired battery output voltage $V_{set}$ (e.g., within a percentage equal to the inverse of the number of cells—within 10% of $V_{set}$ for a 10-cell battery or within 1% of $V_{set}$ for a 100-cell battery). In a fourth step 508, the cells in the series connection of cells are discharged.

After an interval of time, the cell voltages $V_{cell\_on}$, $V_{cell\_off}$ are re-measured (i.e., the method returns to step 502) and new cells, having higher resting voltages $V_{rest}$ (or lower impedances $Z_{cell}$ or highest state of charge), may be substituted or added to the series connection of cells. A cell is removed from a rotation of candidate cells when its voltage falls below a minimum voltage $V_{min}$. The battery is fully discharged when all cells have reached their minimum voltages $V_{min}$ and/or when there is no longer a combination of available cells that can reach $V_{set}$, wherein available cells have a $V_{rest}$ above $V_{min}$. In one embodiment, different combinations or numbers of cells may be selected for the series connection of cells to compensate for different loading requirements placed thereon.

Figure 8:
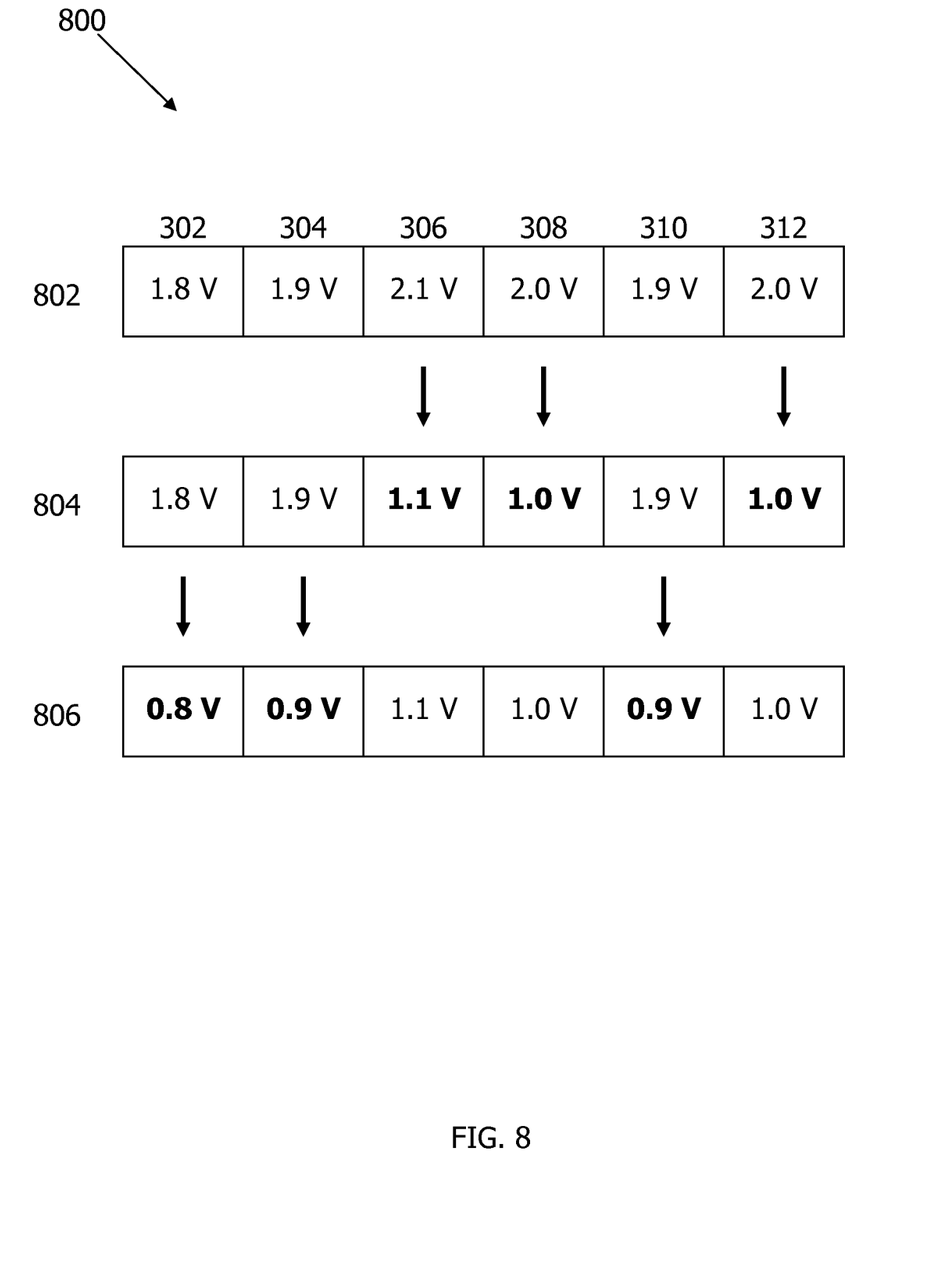
FIG. 8 depicts an exemplary discharging sequence for a string of safe cells in accordance with an embodiment of the invention.

As an example, referring to FIG. 8 and again to FIG. 3, cells 306, 308, 312 are chosen in a first step 802 for discharging after having determined that they have the highest resting voltages ($V_{rest}$=2.1 V, 2.0 V, 2.0 V) and after having determined that the combination of those cells satisfies a desired battery output voltage $V_{set}$ of, for example, 6.0 V (assuming that each cell 302-312 has an operating voltage $V_{operating}$ of 2.0 volts). The cells chosen in the series connection of cells 306, 308, 312 each drop 1.0 V in $V_{rest}$ in a second step 804, at which point new cells 302, 304, 310 are chosen. These cells then drop 1.0 V in a third step 806. If $V_{min}$ is, for example, 0.5 V, the cells 302-312 may be discharged still further in a similar manner. In one embodiment, as the cells 302-312 discharge, more cells are added in the series string.

Figure 6:
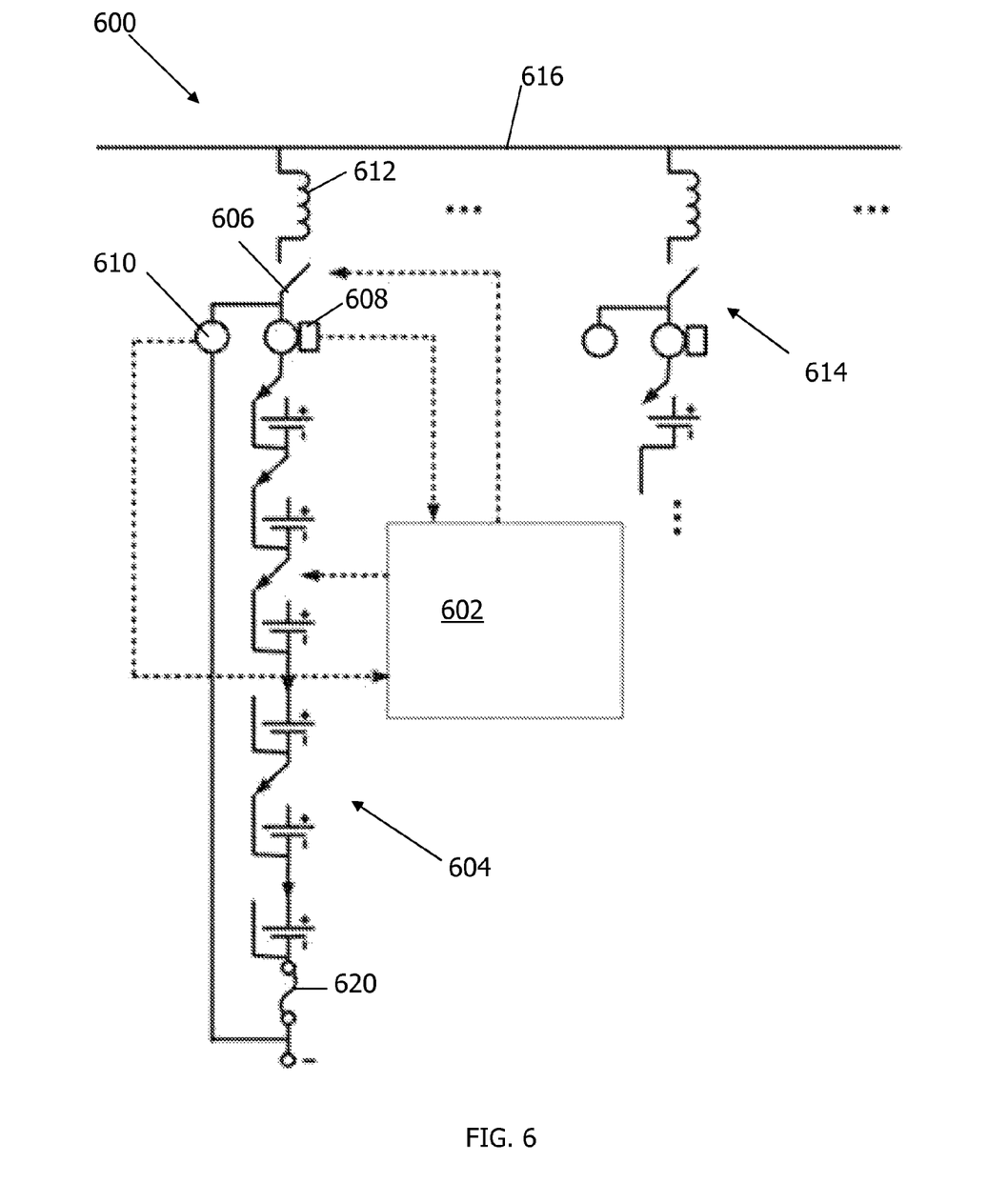
FIG. 6 depicts a string of safe cells having voltage regulation in accordance with an embodiment of the invention.

Additional features may be used with any of the embodiments described above. For example, FIG. 6 illustrates a battery string architecture 600 having voltage regulation. For rough voltage regulation, a processor 602 can switch cells in a string 604 in or out of operation. For fine voltage regulation, the processor 602 may employ pulse-width modulation by opening and closing a string-disconnect switch 606. For a greater voltage, the processor 602 may increase the amount of time per cycle that the string-disconnect switch 606 is closed and, for a lesser voltage, decrease the amount of time per cycle. An inductor 612 may be added to the string to improve the quality of the pulse-width-modulated signal. The processor 602 may sense the string current with a current sensor 608 and the string voltage with a voltage sensor 610. In addition, the string 604 may include a fuse 620 to protect against an over-current condition.

One or more of the cells in a string of cells (for example, cells 302-312 in string 300) may be mismatched in charge capacity when compared to cells in the rest of the string. The mismatch may occur due to manufacturing defects/variations or changes in a cell during its lifetime of use. The mismatch may also be deliberately introduced into the string if, for example, cells from different manufacturers, of different capacities, or of different ages are combined. In one embodiment, time-cycling a subset of cells in the string of cells (i.e., periodically selecting different subsets of cells based at least in part on a determined voltage of each cell) accounts for any such mismatches. For example, a cell having less capacity may be selected for charging or discharging for less total time (during the total charging or discharging cycle) than a cell having more capacity. In this fashion, each cell in a string may be charged to its individual $V_{max}$ (so that the voltage of every cell equals its $V_{max}$ at the end of a charging cycle) or discharged to its individual $V_{min}$ (so that the voltage of every cell equals its $V_{min}$ at the end of a discharging cycle). During charging or discharging, the state of charge of each cell in the string of cells may deviate across the cells by less than 1%; this cell equalization may be achieved by periodically selecting cells that have the greatest deviation (e.g., having the highest or lowest $V_{rest}$) and charging or discharging those cells.

When charging a string of cells, rough voltage regulation may first be used to select a number of cells that together provide an operating voltage $V_{operating}$ as close as possible to a charging voltage $V_{set}$. Then, fine voltage regulation may be used to remove any remaining differences between $V_{operating}$ and $V_{set}$. For example, $V_{set}$ may be 10.0 V and the closest possible $V_{operating}$ may be 8.0 V. In one embodiment, pulse-width modulation (i.e., fine voltage regulation) is used to modulate the output of an entire string of cells to bring the 10.0 V charging voltage $V_{set}$ down to a voltage compatible with $V_{operating}$ (e.g., 8.0 V). In another embodiment, pulse-width modulation is used to modulate the output of a subset of cells in a string or even a single cell in the string. In this embodiment, pulse-width modulation of a subset of cells in a string may provide more precise control of the string's output voltage. Rough and/or fine voltage regulation may be similarly used to adjust a string voltage to an exact value of a desired load voltage when discharging a string of cells.

In addition, embodiments of the current invention may be used to match charger and load requirements in certain applications. For example, solar voltaic arrays generally require a specific load voltage to maximize their provided energy. Conventionally, this matching is done using a power-point tracker ("PPT") that requires a DC-DC converter. Using the methods and systems described above, a string of smart cells may instead be configured to present a nearly ideal charging voltage to the solar voltaic array.

As another example, a motor controller is most efficient when its supply voltage is slightly higher than the motor's back-electromagnetic force ("EMF"). In variable-speed drives, the supply voltage is typically set for the motor's highest speed. At lower speeds, however, the controller generally reduces the voltage using pulse-width modulation. As an alternative, a battery of cells in accordance with the current invention may be employed and its output voltage set to the optimal point for each speed, thereby offering a considerable motor controller efficiency improvement by eliminating the need for pulse-width modulation.

In another embodiment, again referring to FIG. 6, the string architecture 600 may employ multiple strings 604, 614 connected to a common power bus 616. High-power applications may include 10, 100, or any other number of multiple strings 604, 614. The multiple strings 604, 614 may provide redundancy or back-up if one or more strings fail. In one embodiment, multiple strings of lower-current cells are used to create a battery of cells having a large total output current.

Each string 604, 614 may be assigned a separate periodic time to perform cell reordering during a charge or discharge cycle in order to reduce transients or glitches on the power bus 616 due to the switching of a number of strings 604, 614. For example, a first string 604 may switch in or out any additional cells at a first time t=1, and a second string 614 may switch in or out additional cells at a second time t=2. Each string 604, 614 may be disconnected from the power bus 616, using the string switch 606, for a brief amount of time (e.g., a few milliseconds) until the string's switching has settled. This disconnecting may further reduce stress on the switch elements and reduce current disruptions to a load connected to the bus 616.

The terminal voltages of the strings 604, 614 may not exactly match, which may result in a new string having a voltage different from the voltage on the power bus 616 causing a transient voltage to appear on the bus 616 when the new string is connected. These transient effects may be detected and reduced or eliminated. Realizing the connected string's voltages may change due to charge or the load's currents, one embodiment of a transient reduction method includes waiting for the charging or discharging voltage of the string to match a connected string 604, 614 to match the voltage of a disconnected string 604, 614. Once the voltage of the strings match, the strings are together connected to the bus 616. In another embodiment, the voltage of a string 604, 614 that deviates from a common voltage is modulated (by, for example, pulse-width modulation, as described above), so that it appears equal to the common voltage.

The embodiments described herein may be used in a number of applications. For example, electrically powered vehicles such as submarines (manned and unmanned), air vehicles (manned and unmanned), automobiles, and buses may employ the embodiments described herein. Homes and/or power grids that use systems of batteries for charge storage may also employ the embodiments described herein. Further exemplary applications include peak-power-point tracking systems in arrays of solar cells. Essentially, the embodiments described herein may be used in any application that employs one or more rechargeable batteries.

Certain embodiments of the present invention were described above. It is, however, expressly noted that the present invention is not limited to those embodiments. Rather, the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for discharging a battery of cells, comprising:
    determining a voltage and at least one of a resting voltage and an impedance of each of a plurality of cells in the battery;
    selecting a subset of the plurality of cells based at least in part on: (i) the determined voltages, and (ii) at least one of the determined resting voltages and the determined impedances;
    creating a non-contiguous series connection of cells that includes the subset of the plurality of cells; and
    discharging the series connection of cells into a load.

2. The method of claim 1, wherein the series connection of cells comprises at least two adjacent cells.

3. The method of claim 1, wherein an operating voltage of the series connection of cells is approximately equal to a desired voltage across the load.

4. The method of claim 1, further comprising modulating a voltage output by the series connection of cells to the load.

5. The method of claim 1, further comprising re-determining, after a delay, the voltage of each of the plurality of cells.

6. The method of claim 5, further comprising selecting, after the delay, a new subset of the plurality of cells.

7. The method of claim 1, further comprising identifying a faulty cell in the battery and bypassing the faulty cell.

8. The method of claim 1, further comprising monitoring, during discharging, the voltage of each cell in the series connection of cells.

9. The method of claim 1, wherein cells in the series connection of cells are mismatched and a parameter of each cell deviates, during discharging, by less than 1% across the cells.

10. The method of claim 9, wherein the parameter is at least one of resting cell voltage, cell impedance, and percentage of charge.

* * * * *